(12) United States Patent
Labbe

(10) Patent No.: US 9,989,083 B2
(45) Date of Patent: Jun. 5, 2018

(54) SEAL AND BEARING ASSEMBLY FOR A GAS TURBINE ENGINE AND METHOD OF ASSEMBLING SAME

(71) Applicant: PRATT & WHITNEY CANADA CORP., Longueuil (CA)

(72) Inventor: Michel Labbe, Montreal (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 241 days.

(21) Appl. No.: 14/746,241

(22) Filed: Jun. 22, 2015

(65) Prior Publication Data
US 2016/0348522 A1 Dec. 1, 2016

Related U.S. Application Data

(60) Provisional application No. 62/166,546, filed on May 26, 2015.

(51) Int. Cl.
*F16C 17/02* (2006.01)
*F01D 11/00* (2006.01)
(Continued)

(52) U.S. Cl.
CPC ............ *F16C 17/02* (2013.01); *F01D 11/003* (2013.01); *F01D 25/125* (2013.01); *F02C 7/06* (2013.01);
(Continued)

(58) Field of Classification Search
CPC ...... F01D 25/125; F01D 25/183; F16C 17/02; F16C 43/02; F05D 2240/60;
(Continued)

(56) References Cited

U.S. PATENT DOCUMENTS 2,956,824 A * 10/1960 Kuchler ................ F01D 11/003
277/500
2,992,842 A * 7/1961 Shevchenko ......... F01D 11/003
277/306
(Continued)

FOREIGN PATENT DOCUMENTS

FR 3036441 A1 * 11/2016 ........... F01D 25/125

OTHER PUBLICATIONS

English translation of FR 3036441.*

*Primary Examiner* — Ninh H Nguyen
*Assistant Examiner* — Topaz L Elliott
(74) *Attorney, Agent, or Firm* — Norton Rose Fulbright Canada LLP

(57) ABSTRACT

A seal and bearing assembly of a gas turbine engine having an engine case with a cooling fluid nozzle located between a bearing outer ring and ring segments, and a rotary shaft for rotation in the engine case around a main axis, the seal and bearing assembly can be assembled by positioning the engine case and the rotary shaft in axial alignment, and axially moving the engine case relative to the rotary shaft including moving the bearing outer ring across the axial location of the runner portion and into an assembled condition. The rotary shaft having mounted thereon a bearing inner ring and a runner assembly having a runner portion, a sleeve portion being concentric and radially internal to the runner portion, and a cooling fluid passage having a radial segment leading from an outgoing segment to a returning segment extending in a direction leading back toward the bearing inner ring.

20 Claims, 8 Drawing Sheets

(51) Int. Cl.
  *F16J 15/16*   (2006.01)
  *F16C 33/76*   (2006.01)
  *F01D 25/12*   (2006.01)
  *F02C 7/28*    (2006.01)
  *F02C 7/06*    (2006.01)
  *F16C 43/02*   (2006.01)
  *F16C 33/74*   (2006.01)

(52) U.S. Cl.
  CPC ................ *F02C 7/28* (2013.01); *F16C 33/74* (2013.01); *F16C 33/76* (2013.01); *F16C 43/02* (2013.01); *F16J 15/162* (2013.01); *F05D 2220/32* (2013.01); *F05D 2230/60* (2013.01); *F05D 2240/50* (2013.01); *F05D 2240/55* (2013.01); *F05D 2260/20* (2013.01); *F16C 2360/23* (2013.01); *Y10S 277/907* (2013.01); *Y10S 277/93* (2013.01)

(58) Field of Classification Search
  CPC ............. F05D 2240/61; F05D 2260/20; Y10S 277/93; F16J 15/162
  See application file for complete search history.

(56) References Cited

U.S. PATENT DOCUMENTS

| | | | |
|---|---|---|---|
| 4,453,784 A | 6/1984 | Kildea et al. | |
| 4,648,485 A * | 3/1987 | Kovaleski | F01D 25/18 184/13.1 |
| 4,858,426 A * | 8/1989 | Holcomb | F01D 25/18 184/6.11 |
| 5,107,676 A | 4/1992 | Hadaway et al. | |
| 5,272,868 A | 12/1993 | Ciokajlo et al. | |
| 5,301,957 A * | 4/1994 | Hwang | F16C 33/76 277/350 |
| 5,593,165 A | 1/1997 | Murray et al. | |
| 5,813,830 A * | 9/1998 | Smith | F16J 15/442 277/349 |
| 6,409,464 B1 | 6/2002 | Fisher et al. | |
| 6,511,228 B2 * | 1/2003 | Dusza | F16C 33/6651 384/475 |
| 6,996,968 B2 | 2/2006 | Peters et al. | |
| 7,373,780 B2 | 5/2008 | Peters et al. | |
| 7,430,850 B2 | 10/2008 | Peters et al. | |
| 7,435,052 B2 | 10/2008 | Spencer et al. | |
| 7,905,325 B1 | 3/2011 | Wedlake et al. | |
| 7,938,230 B2 | 5/2011 | Servant et al. | |
| 8,308,426 B2 | 11/2012 | Cigal et al. | |
| 8,464,835 B2 | 6/2013 | Munson | |
| 8,857,149 B1 | 10/2014 | Muldoon | |
| 2006/0037302 A1 | 2/2006 | Peters et al. | |
| 2009/0136368 A1 * | 5/2009 | Arnold | F01D 5/027 417/407 |
| 2013/0283758 A1 | 10/2013 | Wotzak | |
| 2014/0311155 A1 | 10/2014 | Lewis et al. | |

* cited by examiner

SEAL AND BEARING ASSEMBLY FOR A GAS TURBINE ENGINE AND METHOD OF ASSEMBLING SAME

CROSS-REFERENCE TO RELATED APPLICATIONS

This application is indirectly related to U.S. application Ser. No. 13/917,075, the entire contents of which are incorporated by reference herein.

TECHNICAL FIELD

The invention relates generally to gas turbine engines, and more particularly to seals for bearing cavities of gas turbine engines.

BACKGROUND OF THE ART

Contact seals, often made of carbon and hence referred to correctly or incorrectly as carbon seals, are commonly used to provide a fluid seal around a rotating shaft, particularly high speed rotating shafts used in high temperature environments such as in gas turbine engines. Such contact seals usually comprise ring segments and a runner which abut and rotate relative to each other to form a rubbing, contact interface which creates a fluid seal around the shaft. Pressurized gas can be used to force the ring segments against the seal runner and create a gas pressure differential with the bearing cavity which repels impinging oil. Typically, but not necessarily, the seal runner is disposed on the rotating shaft and rotates within an outer stationary ring, causing the rubbing interface between the rotating seal runner and the rotationally-stationary ring. Although efforts are made to limit friction, the rubbing contact can generate significant heat during operation, especially in the context of high rotational speeds of gas turbine engine shafts, and means are provided to dissipate this heat. This heat dissipation is most often accomplished using fluid cooling, for example oil from the engine's recirculating oil system which is sprayed onto exposed surfaces of the seal runner and/or the ring.

It was known to provide seal runners which were internally cooled. Publication US 2014-0369832, in particular, discloses a runner assembly having a plurality of independent, circumferentially interspaced, tortuous internal cooling fluid conduits along which cooling fluid was conveyed to cool the radially-inner surface of the seal runner. While this runner assembly had a relatively small radial thickness, which was particularly sought in the context, the cooling fluid passages terminated in outlet apertures.

Accordingly, there always remains room for improvement.

SUMMARY

In one aspect, there is provided a seal and bearing assembly of a gas turbine engine having an engine case with a cooling fluid nozzle located between a bearing outer ring and ring segments, and a rotary shaft for rotation in the engine case around a main axis, the seal and bearing assembly can be assembled by positioning the engine case and the rotary shaft in axial alignment, and axially moving the engine case relative to the rotary shaft including moving the bearing outer ring across the axial location of the runner portion and into an assembled condition. The rotary shaft having mounted thereon a bearing inner ring and a runner assembly having a runner portion, a sleeve portion being concentric and radially internal to the runner portion, and a cooling fluid passage having a radial segment leading from an outgoing segment to a returning segment extending in a direction leading back toward the bearing inner ring.

In another aspect, there is provided a gas turbine engine comprising one or more compressors, a combustor and one or more turbines, at least one of said compressors and at least one of said turbines being interconnected by an engine shaft rotating about a longitudinal axis thereof, the gas turbine engine comprising: a rotary assembly having a bearing inner ring and a runner assembly both mounted to a rotary shaft of the gas turbine engine, the runner assembly having a runner portion, a sleeve portion being concentric and radially internal to the runner portion, and a cooling fluid passage having an inlet communicating with a radially-inner surface of the sleeve portion at a proximal end of the runner assembly, an outgoing segment extending from the inlet and axially along the radially-inner surface of the sleeve portion, away from the bearing inner ring, to a distal end of the runner assembly, a radial segment leading from the outgoing segment to a radially-inner surface of the runner portion at the distal end of the runner assembly, and a returning segment extending from the radial segment and axially along the radially-inner surface of the runner portion, toward the bearing inner ring; and a case assembly rotatably receiving the rotary assembly, the case assembly having a bearing outer ring complementary to the bearing inner ring in receiving roller elements therebetween, ring segments positioned in abutment with the radially-outer surface of the runner portion, a bearing cavity extending from the ring segments to the bearing outer ring, and at least one cooling fluid nozzle positioned in the bearing cavity between the bearing outer ring and the ring segments, the at least one cooling fluid nozzle being directed radially inward and operable to feed cooling fluid to the inlet of the cooling fluid passage of the runner assembly during use.

In a further aspect, there is provided a seal and bearing assembly for a gas turbine engine, the seal and bearing assembly comprising: a rotary assembly having a bearing inner ring and a runner assembly both mounted to a rotary shaft of the gas turbine engine, the runner assembly having a runner portion, a sleeve portion being concentric and radially internal to the runner portion, and a cooling fluid passage having an inlet communicating with a radially-inner surface of the sleeve portion at a proximal end of the runner assembly, an outgoing segment extending from the inlet and axially along the radially-inner surface of the sleeve portion, away from the bearing inner ring, to a distal end of the runner assembly, a radial segment leading from the outgoing segment to a radially-inner surface of the runner portion at the distal end of the runner assembly, and a returning segment extending from the radial segment and axially along the radially-inner surface of the runner portion, toward the bearing inner ring; and a case assembly rotatably receiving the rotary assembly, the case assembly having a bearing outer ring complementary to the bearing inner ring in receiving roller elements therebetween, ring segments positioned in abutment with the radially-outer surface of the runner portion, a bearing cavity extending from the ring segments to the bearing outer ring, and at least one cooling fluid nozzle positioned in the bearing cavity between the bearing outer ring and the ring segments, the at least one cooling fluid nozzle being directed radially inward and operable to feed cooling fluid to the inlet of the cooling fluid passage of the runner assembly during use.

In a further aspect, there is provided a method of assembling a seal and bearing assembly of a gas turbine engine having an engine case and a rotary shaft for rotation in the engine case around a main axis, the seal and bearing assembly including: a bearing inner ring and a runner assembly both mounted to a rotary shaft, the runner assembly having a runner portion, a sleeve portion being concentric and radially internal to the runner portion, and a cooling fluid passage having an outgoing segment extending along a radially-inner surface of the sleeve portion, a returning segment extending along the radially-inner surface of the runner portion, and a radial segment bridging the outgoing segment and the returning segment at a distal end of the runner assembly, and a bearing outer ring, ring segments and at least one cooling fluid nozzle, all being mounted to the engine case, with the at least one cooling fluid nozzle being located between the axial locations of the bearing outer ring and the ring segments and being directed radially inwardly, the method of assembly comprising: positioning the engine case and rotary shaft in axial alignment, and axially moving the engine case relative to the rotary shaft including moving the bearing outer ring across the axial location of the runner portion and into an assembled condition in which roller elements are operably received between the bearing outer ring and the bearing inner ring.

DESCRIPTION OF THE DRAWINGS

Reference is now made to the accompanying figures in which.

DETAILED DESCRIPTION

Figure 1:
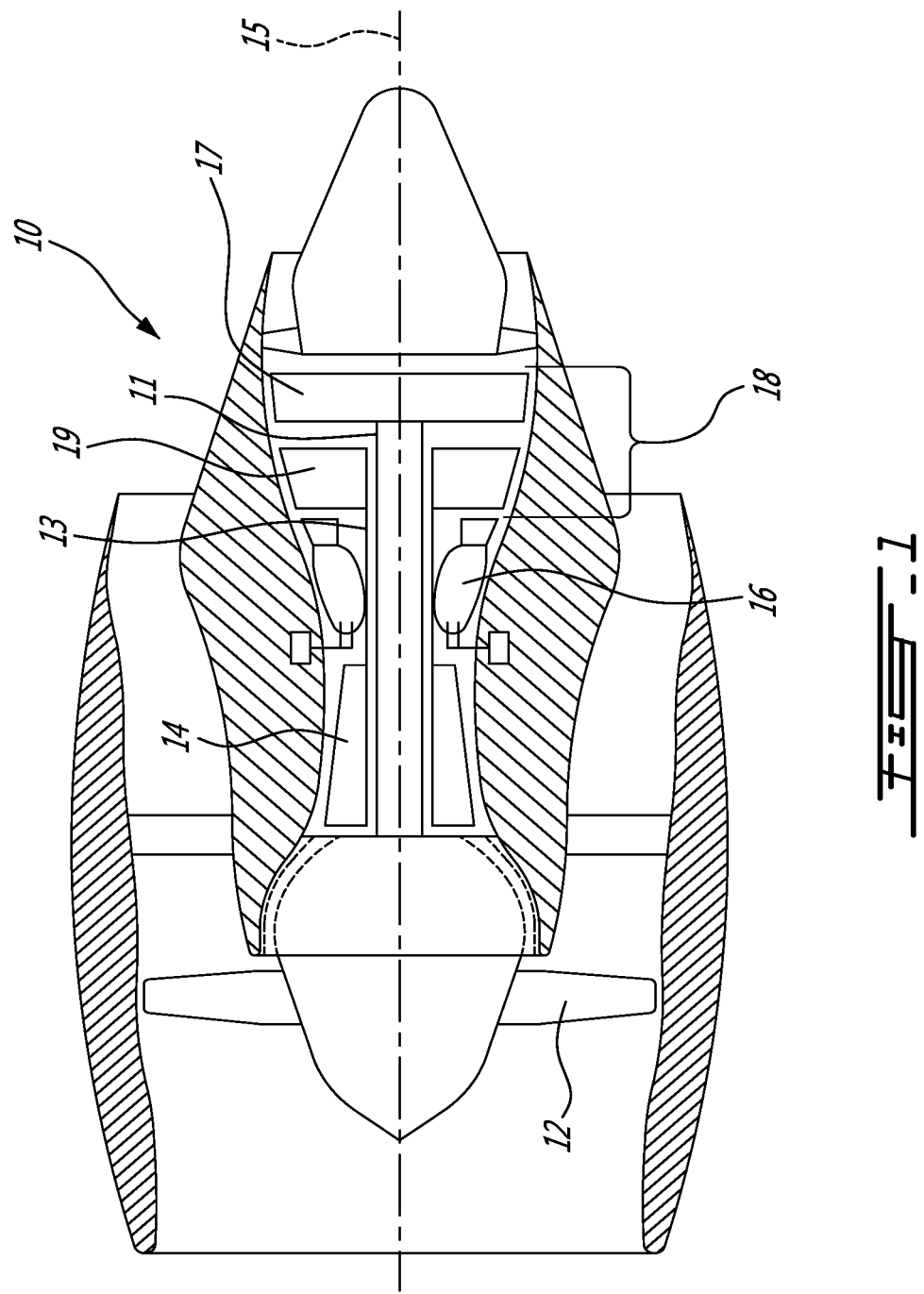
FIG. 1 is a schematic cross-sectional view of a gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

In the depicted embodiment, the turbine section 18 comprises a low pressure turbine 17 and a high pressure turbine 19. The engine 10 also preferably includes at least two rotating main engine shafts, namely a first inner shaft 11 interconnecting the fan 12 with the low pressure turbine 17, and a second outer shaft 13 interconnecting the compressor 14 with the high pressure turbine 19. The inner and outer main engine shafts 11 and 13 are concentric and rotate about the centerline axis 15 which is collinear with their longitudinal axes.

The main engine shafts 11, 13 are supported at a plurality of points by bearings, and extend through several engine cavities. As such, a number of shaft seals are provided to ensure sealing about the shafts at several points along their length to prevent unwanted fluid leaking from one engine compartment or cavity. For example, in some engine configurations, compressed air in the main engine gas passage must be kept separate from the secondary cooling air or bearing lubrication oil in bearing cavities and cooling cavities adjacent to the main engine gas passage.

Figure 2:
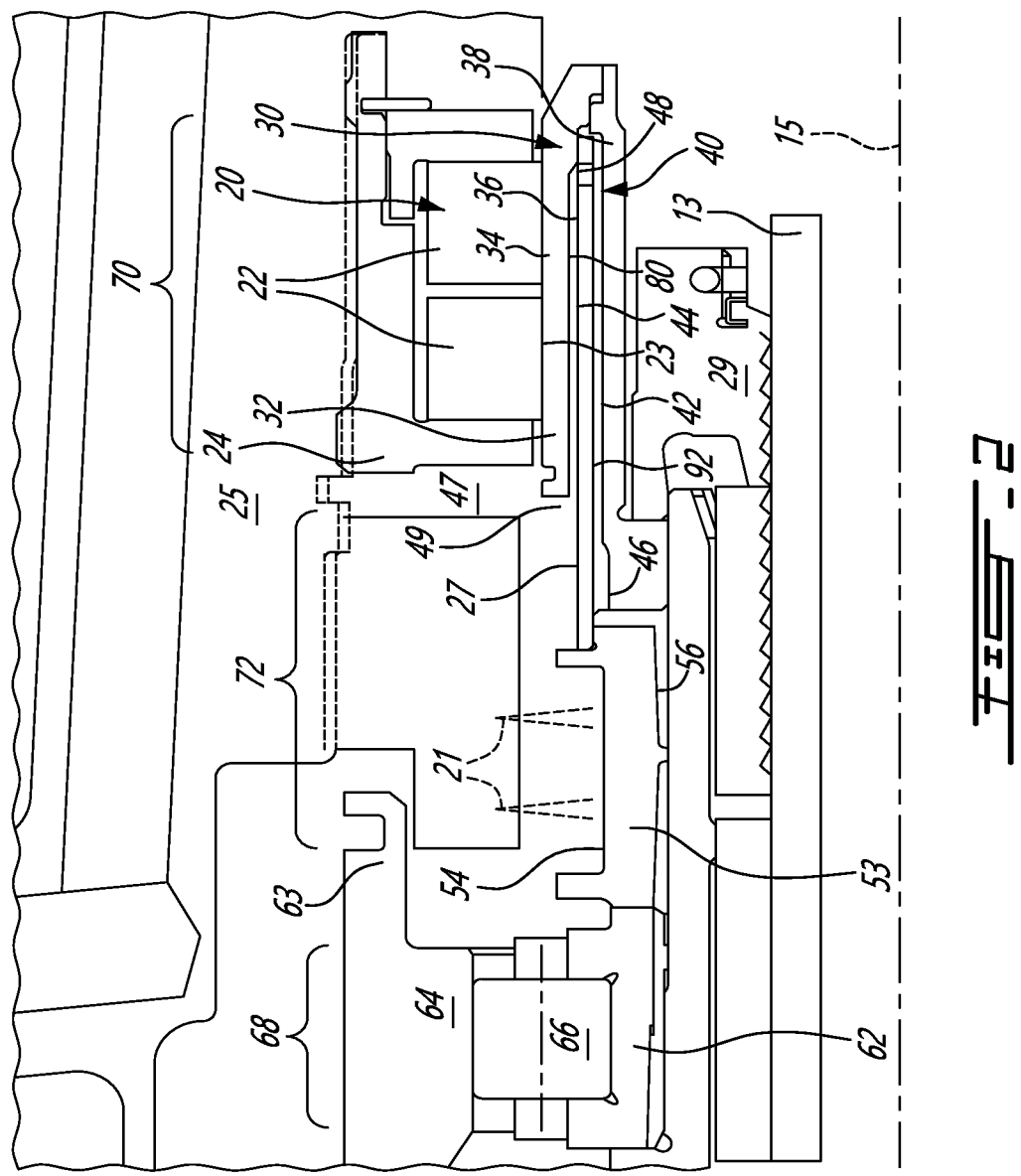
FIG. 2 is a schematic cross-sectional view of a seal and bearing assembly in an assembled configuration.

Referring now to FIG. 2, at least one of the shaft seals used to seal the rotating shaft 11 and/or 13 in the engine 10 is a contact seal 20, as will now be described in further detail. The contact seal 20 includes generally a number of rotationally stationary ring segments 22 (made of carbon in this embodiment) which together form at least one circumferentially interrupted annular ring assembly, and a rotating runner assembly 30 connected to one of the rotating engine shafts of the gas turbine engine 10 (such as the shaft 13 for example) and rotatable relative to the ring segments 22. In this embodiment, the ring segments 22 are arcuate carbon segments circumferentially arranged within the seal housing 24, the housing 24 being, in turn, fastened in fixed position to a supporting engine support and/or casing segment which will be generally referred to herein as a case 25. Further, as seen in FIG. 2, the ring segments 22 may include a pair of axially spaced segmented annular rings assemblies.

Referring still to FIG. 2, the runner assembly 30 is located adjacent to and radially inwardly from the ring segments 22 to thereby create a rotating contact interface between the ring segments 22 and the runner assembly 30, to form a substantially fluid tight seal therebetween when the engine shaft 13 rotates during operation of the engine 10. More particularly, a radially-outer surface 32 of the runner assembly 30 contacts the radially-inner surfaces 23 of the ring segments 22. As will be seen, the runner assembly 30 is internally cooled, in that the radially-outer contact surface 32 of the runner assembly does not require external spray cooling but rather is cooled from within by circulating the cooling fluid (such as, but not necessarily, oil) internally within the fluid passage 40 formed within the runner assembly 30. The cooling oil is distributed to the runner assembly via one or more cooling fluid nozzles 21 which feed the cooling oil radially inwardly onto the circumferentially extending open topped channel 54 disposed at an end 27 of the runner assembly 30 which will be referred to herein as the proximal end for its axial proximity to the bearing. More specifically, the nozzles 21 protrude axially under a ledge 63 of a radially-bearing outer ring 64 in order to satisfactorily reach the open topped channel 54.

Referring still to FIG. 2, the seal and bearing assembly can be seen to include a radially-bearing inner ring 62 and a radially-bearing outer ring 64 which cooperate in receiving roller elements 66 therein during use. The radially-bearing outer ring 64 is mounted to the engine case 25 with the ring segments 22 whereas the radially-bearing inner ring 62 is mounted to the shaft 13 with the runner assembly 30 and the annular scoop member 53. The axial location 68 of the radially-bearing outer ring 64 is axially spaced apart from the axial location 70 of the contact seal 20. The cooling fluid nozzles 21 are also mounted to the case 25, at an axial location 72 associated to the bearing cavity 47, between the axial locations 68 and 70 of the bearing and seal, respectively.

Figure 3:
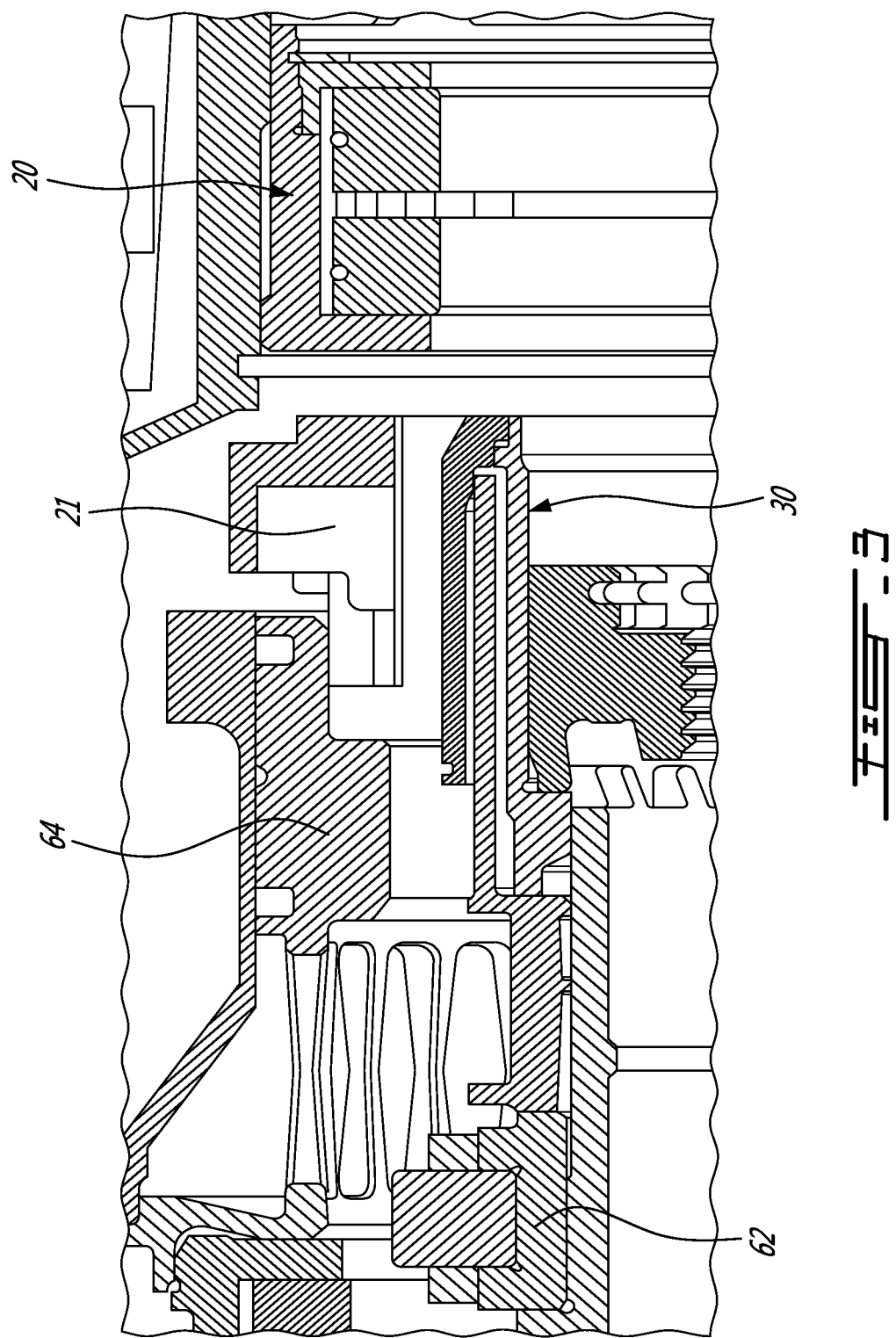
FIG. 3 is a schematic cross-sectional view of the seal and bearing assembly of FIG. 2 in an unassembled configuration.

Turning now to FIG. 3, the case 25 and the shaft 13 are shown axially offset from one another. The components are represented at given step of the installation method at which the case and the shaft are axially aligned with one another in a manner for the axes thereof to coincide, but have not yet been moved axially toward one another until the relative positions of use have been reached. Accordingly moving the case 25 axially and toward the shaft 13 can lead to the assembled configuration which is shown in FIG. 2.

It will be noted that in the axial relative movement of the method of assembly referred to above, the nozzles move across the axial location of the contacting surface 32 of the runner, into the bearing cavity, until the bearing outer ring becomes aligned with the bearing inner ring and the ring segments 22 of the contact seal become aligned with the contacting surface 32 of the runner. Accordingly, the amount of radial spacing available to pass the fluid nozzles along this passage is limited externally by the internal diameter of the ledge of the bearing outer ring, and internally by the outer diameter of the contacting surface 32 of the runner. It was found that using a runner assembly having an internal cooling fluid passage designed such as shown and described herein could allow achieving a satisfactorily axially-compact runner design which allows for a satisfactory amount of radial spacing externally of the runner assembly for the passage of the fluid nozzles during installation.

Figure 4:
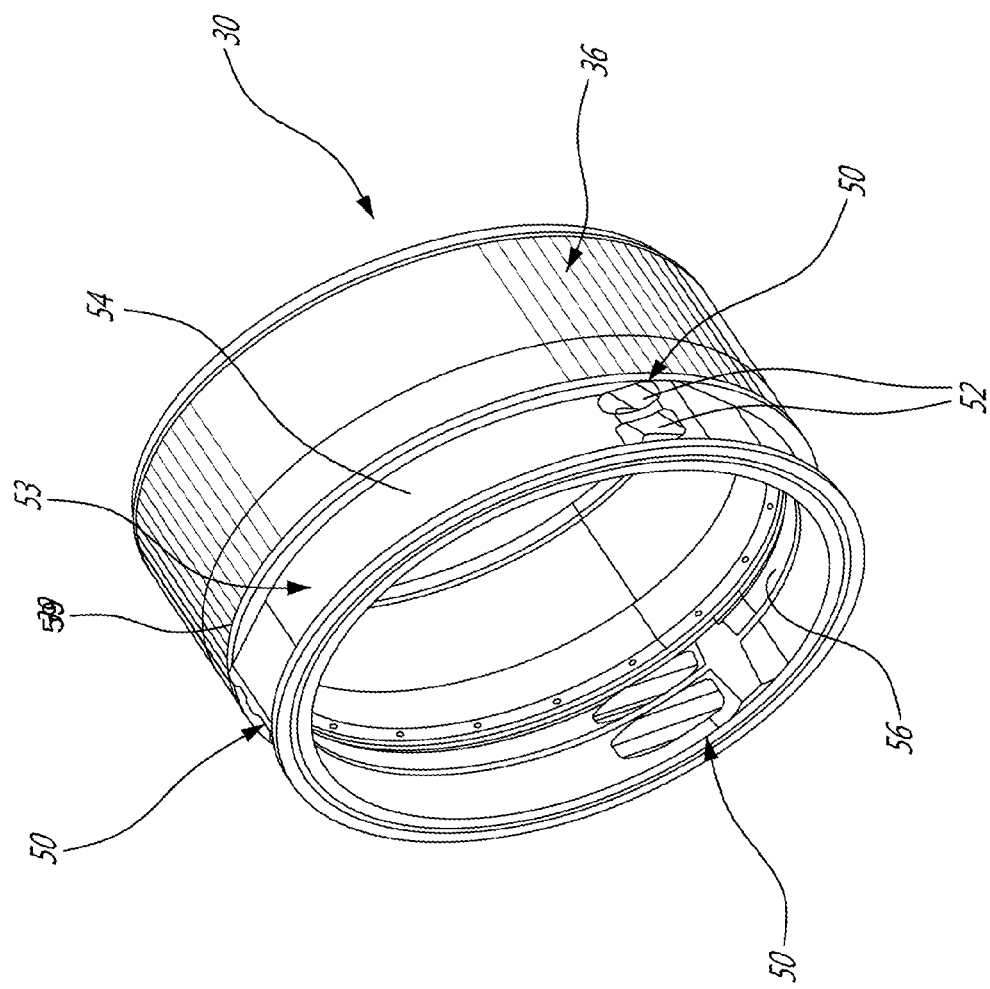
FIG. 4 is an oblique view of an example of an annular scoop member made integral to a seal runner of a seal and bearing assembly.

As better seen in FIG. 4, the runner assembly 30 also includes at least one integrated oil scoop 50 that is integrally formed with the sleeve portion 36 of the runner assembly 30. In the depicted embodiment, the runner assembly 30 in fact includes three oil scoops 50 which are substantially equally circumferentially spaced apart about the inner annular portion 34 of the runner assembly 30. Each of the oil scoops 50 are disposed in fluid flow communication with the cooling fluid passage 40 within the runner assembly 30, and more particularly the oil scoops 50 collect and feed the cooling oil into the fluid passage 40 such as to internally cool the runner assembly 30 during operation of the engine. Each of the oil scoops 50 may include a pair of openings 52 which extend radially inwardly through an annular member in a direction of rotation of the runner assembly. The openings 52 of each of the oil scoops 50 are disposed at an angle such that rotation of the runner assembly 30 causes oil within the radially open topped annular scoop channel 54 to be scooped up and forced radially inwardly through the openings 52 of the oil scoops 50. Cooling fluid that is collected by the oil scoops 50 and forced inwardly through the scoop openings 52 is directed into an annular distribution channel 56, which is formed in the radially-inner surface of the annular member. The oil or other cooling fluid used will therefore collect in this annular distribution channel 56 during operation of the engine, as a result of the centripetal forces acting on the fluid.

Returning now to FIG. 2, in this specific embodiment, the runner assembly 30 comprises first, second and third annular portions which will be referred to herein as the runner portion 34, sleeve portion 36, and enclosing portion 38 for ease of reference. The runner portion 34, sleeve portion 36, and enclosing portion 38 are concentric with one another, axially elongated and at least partially axially overlapping, and radially spaced apart from one another in a manner that the radial spacing between the sleeve portion 36 and the enclosing portion 38 forms an outgoing segment 42 of the cooling fluid passage 40 and the radial spacing between the sleeve portion and the runner portion forms a returning segment 44 of the cooling fluid passage. During use, cooling fluid is sprayed by the nozzles 21, captured by scoops 50 and directed to a radially-inner facing channel 56 against which it is guided by centripetal acceleration, and enters the fluid passage 40 via an inlet 46 located at a proximal end 27 of the runner assembly 30. Centripetal acceleration combined with the designed shape of the runner components directs (pumps) the cooling fluid in a manner to form a film which travels axially against a radially-inner surface 92 of the sleeve member 36 from the inlet toward another end of the runner assembly 30 which will be referred to herein as the distal end by contradistinction with the proximal end and with reference with its distance to the bearing. A radial segment 48, radially-outwardly directed, of the fluid passage 40 is provided in the form of a passageway at the distal end of the runner assembly 30, fluidly linking the outgoing segment 42 and the returning segment 44 across a radial thickness of the sleeve portion. The passageway can be in the form of holes in the sleeve portion 36, or in the form of a gap between a free tip of the sleeve portion and the rest of the runner assembly, for instance, across which the cooling fluid travels radially outwardly and against the radially-inner 'cooling' surface 80 of the runner portion 34. A film of cooling fluid is thus formed on the radially-inner surface 80 of the runner portion 34 which travels back toward the bearing inner ring 62. The cooling fluid passage 40 terminates at the proximal end of the runner assembly 30 by a gap 49 provided between an axial end of the runner portion 34 and a radially-outer surface of the sleeve portion 36, across which the film of oil is free to escape to the bearing cavity 47. It was found that the gap 49 could be sized in a manner to represent a lesser likelihood of blockage than a plurality of apertures, for instance.

As noted above, at least one fluid passage 40 is radially defined within the runner assembly 30, into which cooling oil is fed to cool the runner assembly 30 in general, and the hot radially-outer runner portion 34 having the outer contact surface 32 thereon in particular. Accordingly, the fluid passage 40 is internally formed within the runner assembly 30 such that the runner assembly 30 is cooled from within. Cooling oil within the fluid passage 40 will be forced radially outward by centrifugal force, thereby ensuring that the cooling oil is maintained in contact with the inner surface of the hot outer runner portion 34, which defines the contact surface on the opposed radially-outer surface for rubbing against the ring segments 22. Thus, the underside, or radially-inner surface 80 of the runner, is cooled internally, by absorbing the heat therefrom using the circulating cooling fluid flow. Further, the centrifugal force stemming from the rotation will also generate pumping of the cooling fluid, using the integrated oil scoops 50.

The runner assembly 30 may be formed in a number of different manners, and may comprise one, two or more separate components which together form the present runner assembly 30. For example, in one embodiment the runner assembly may be formed using a three-dimensional printing production technique, whereby the runner assembly is integrally formed of a single piece (i.e. is monolithic). In another possible embodiment of the present disclosure, the runner assembly is composed of two or more portions, which are separately formed and engaged or otherwise assembled together to form the finished runner assembly. Although welds may be used to engage the components of the runner assembly together, other suitable engagements means may also be used, such as for example only, brazing, bonding, adhering, fastening, trapping abutment, etc.

Figure 5:
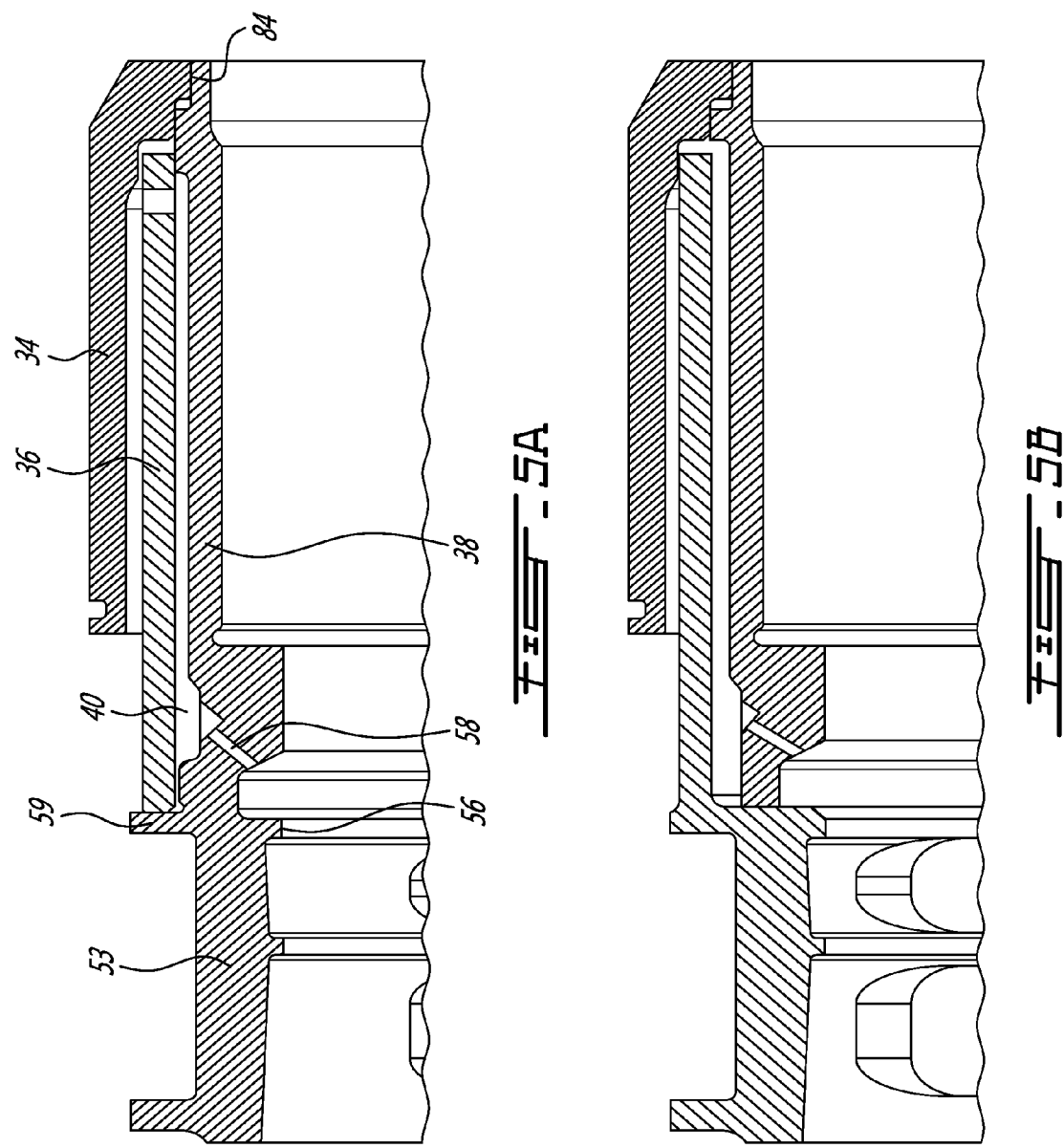
FIG. 5A is a schematic cross-sectional view of the seal and bearing assembly.
FIG. 5B is a schematic cross-sectional view of an alternate embodiment of a seal and bearing assembly.

For instance, another embodiment of a runner assembly is shown in FIG. 5A. In this embodiment, the inlet of the cooling fluid channel is formed plurality of angled entry holes 58 which extend radially and axially outwardly from the inner distribution channel 56, and permit fluid flow from the annular distribution channel 56 into the tortuously shaped cooling fluid passage 40. The enclosing portion 38 of the runner is integral to the annular scoop member 53 sleeve portion and can be made of the same monolithic component. The sleeve portion 36 is made integral to the enclosing portion 38 and annular scoop member 53 by welding its proximal end to a flange 59 of the annular scoop member 53. Its distal edge can be sandwiched and trapped between the distal end of the enclosing portion 38 and the distal end of the runner portion 34 and holes or another form of passage can be provided near the distal end of the sleeve portion 36 to allow the cooling fluid to pass from the outgoing segment 42 of the cooling fluid passage 40 to the returning segment 44 of the cooling fluid passage 40, under the contacting, radially-outer surface 32 of the runner portion 34, for cooling. Still in the embodiment of FIG. 5A, the runner portion 34 is produced as an initially separate annular component which is made integral to the rest of the runner by welding 84 of the distal end to the distal end of the enclosing portion 38. It was found that assembling these latter components with a weld could also satisfactorily seal the distal end of the cooling fluid passage 40.

Still another embodiment of a runner assembly is shown in FIG. 5B. In the embodiment of FIG. 5B, the sleeve portion 36 is monolithic with the annular scoop member 53 whereas the runner portion 34 and the enclosing portion 38 are made integral to one another by welding at their distal ends, but are separable from the sleeve portion 36 and annular scoop member 53 during maintenance, which can be considered preferable in certain embodiments. Many other configurations are possible.

Figure 6:
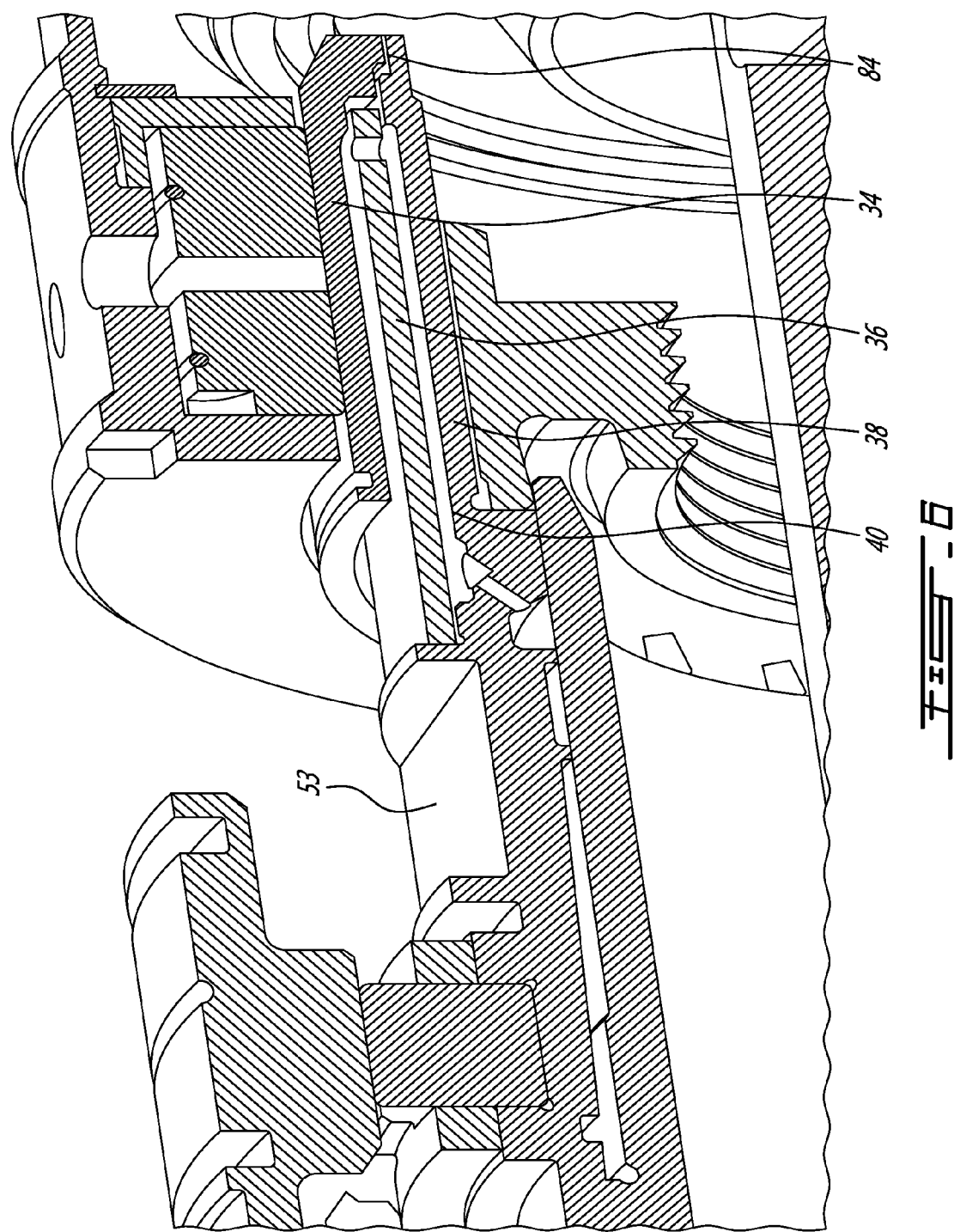
FIG. 6 is an oblique view of the seal and bearing assembly of FIG. 5A.

FIG. 6 is an oblique view of the runner assembly of FIG. 5A in a schematized example environment of use, and can be useful in more intuitively understanding the arrangement of components than by solely referring to the cross-sectional view.

It will be understood that in the embodiment shown in FIG. 2, the bearing and seal assembly shown is a bearing and seal assembly of a high pressure turbine stage, but it will be understood that the bearing and seal assembly described herein can alternately be applied to a low turbine stage, or to a compressor stage, for instance. In alternate embodiments, the seal can be forward of the bearing or rearward of the bearing.

Figure 7:
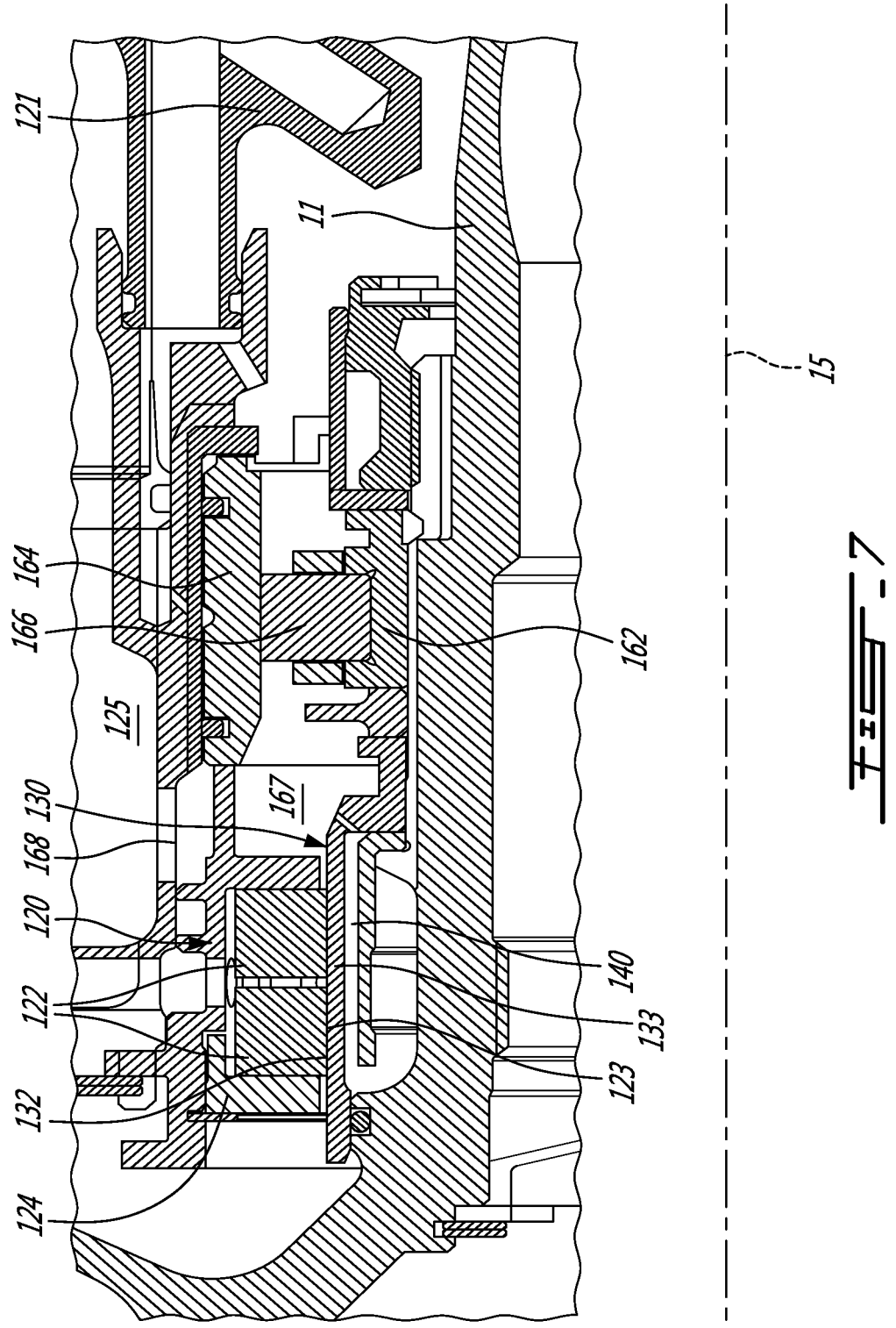
FIG. 7 is a partial cross-sectional view of a bearing and seal assembly.

Referring now to FIG. 7, another embodiment of a bearing and seal assembly is shown where at least one of the shaft seals used to seal the rotating shaft 11 and/or 13 in the engine 10 is a contact seal 120, as will now be described in further detail.

The contact seal 120 includes generally a number of rotationally stationary ring segments 122 (made of carbon in this embodiment) which together form at least one circumferentially interrupted annular ring assembly, and a rotating runner assembly 130 connected to one of the rotating engine shafts of the gas turbine engine 110 (such as the shaft 11 in this example) and rotatable relative to the ring segments 122. In this embodiment, the ring segments 122 are arcuate carbon segments circumferentially arranged within the seal housing 124, the housing 124 being, in turn, fastened in fixed position to a supporting engine support and/or casing segment which will be generally referred to herein as a case 125. Further, as seen in FIG. 7, the ring segments 122 may include a pair of axially spaced segmented annular ring assemblies.

Referring still to FIG. 7, the seal and bearing assembly can be seen to include a radially bearing inner ring 162 and a radially bearing outer ring 164 which cooperate in receiving roller elements 166 therein during use. The radially bearing outer ring 164 is mounted to the engine case 125 and are thus made integral to the ring segments 122 whereas the radially-bearing inner ring 162 is mounted to the shaft 11 and rotates with the runner assembly 130. The radially-bearing outer ring 164 is axially spaced apart from the contact seal 120 and a bearing cavity 167 extends therebetween. The bearing cavity 167 leads to a radially external scavenge window 168 in the case 125.

Referring still to FIG. 7, the annular runner assembly 130 is located adjacent to and radially inwardly from the ring segments 122 to thereby create a rotating contact interface between the ring segments 122 and the rotating runner assembly 130, to form a substantially fluid tight seal therebetween when the engine shaft 11 rotates during operation of the engine 10. More particularly, a radially-outer surface 132 of the runner assembly 130, which can alternately be referred to as a contacting surface, contacts the radially-inner surfaces 123 of the ring segments 122. As will be seen, the runner assembly 130 is internally cooled, in that the radially-outer surface 132 of the runner assembly does not require external spray cooling but rather is cooled from within by circulating the cooling fluid (such as, but not necessarily, oil) internally within the fluid passage 140 formed within the runner assembly 130, and more specifically against a radially-inner surface 133 which is radially-opposite to the radially-outer surface 132 which receives the heat. The cooling fluid is distributed to the runner assembly via one or more non-rotating cooling fluid nozzles 121 and the configuration of the seal and bearing assembly is designed for the cooling fluid to be carried, given centripetal acceleration in the context of the rotating components forming the cooling fluid passage, along a given passage and to and along the fluid passage 140 formed in the runner assembly 130.

Figure 8:
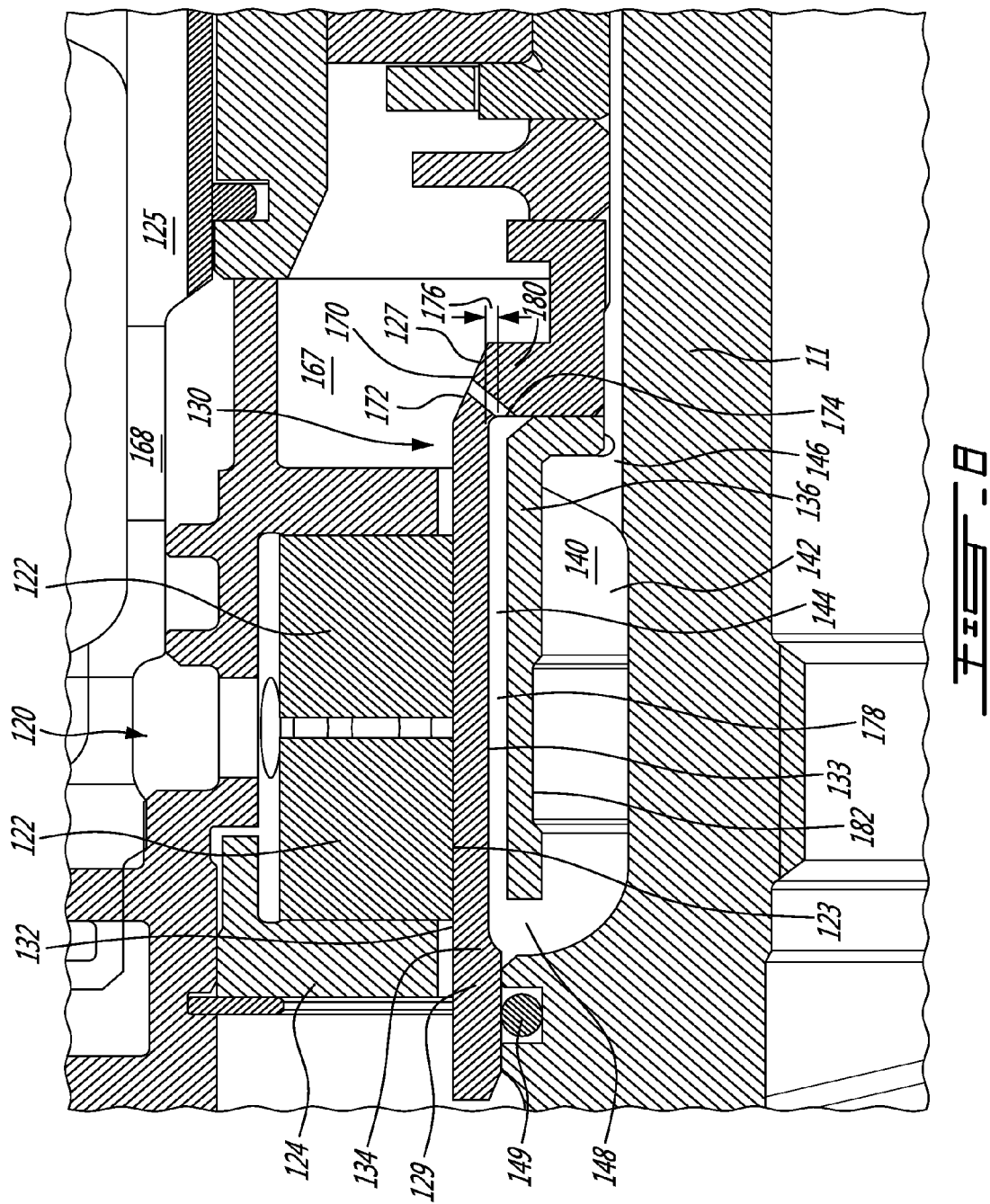
FIG. 8 is an enlarged portion of FIG. 7 showing a contact seal assembly with an internally cooled seal runner in greater detail.

As perhaps best seen in FIG. 8, in this specific embodiment, the runner assembly 130 comprises a first and a second annular portions which will be referred to herein as the runner portion 134 and the sleeve portion 136 for ease of reference. The runner portion 134 and the sleeve portion 136 are concentric with one another, axially elongated and at least partially axially overlapping, and radially spaced apart from one another in a manner that the radial spacing between the sleeve portion 136 and the runner portion 134 forms a returning segment 144 of the cooling fluid passage 140 (e.g. returning toward the bearing). Moreover, in this embodiment, an enclosing portion of fluid passage 140 is formed by the radially-outer surface of the shaft 11 which is also annular (hollow) and axially elongated, extending from a spray receiving inlet associated with the position of the nozzles 121, radially-inside the bearing and the runner assembly 130 where it internally encloses the fluid passage 140, and leading, in this particular embodiment, to a fan and boost attachment. Accordingly, an outgoing segment of the fluid passage can be said to be formed by the radial spacing between the sleeve portion 136 and the shaft 11.

During use, cooling fluid enters the fluid passage 140 via an inlet 146 located at a proximal end 127 of the runner assembly 130. Centripetal acceleration combined with the designed shape of the runner components directs the cooling fluid in a manner to form a film which travels axially against a radially-inner surface of the sleeve portion 136 from the inlet 146 toward the distal end of the runner assembly 130.

A radial segment 148 of the fluid passage 140 is provided at the distal end of the runner assembly, bridging the outgoing segment 142 and the returning segment 144 of the cooling fluid passage 140. In this specific embodiment, the radial segment 148 is provided in the form of a gap extending between a distal edge of the sleeve portion 136 and an abutted joint between a distal end of the runner portion 134 and the shaft 11 and which is sealed with an O-ring member 149 trapped therebetween, however, in alternate embodiments, it will be understood that the radial segment 148 can be in the form of apertures formed in the sleeve portion, for instance. Cooling fluid travels in the radial segment 148 in a radially outward direction across the radial thickness of the sleeve portion 136, and against a radially-inward face of the runner portion 134. Cooling fluid then travels back toward the bearing along the radially-inner surface 133 of the runner portion 134 and exits the cooling fluid passage 140 at the proximal end 127 of the runner assembly 130 by an outlet 170 which can be in the form of a plurality of circumferentially interspaced apertures 172 across the proximal end 127 of the runner portion 134 or in the form of an annular aperture or of a plurality of circumferentially interspaced partially-annular (arcuate) apertures formed in the proximal end 127 of the runner portion 134, to name a few examples. The cooling fluid exiting the cooling fluid passage 140 in the runner assembly 130 escapes to the bearing cavity 167 and through the scavenge window 168.

It will be noted in this embodiment that the one or more outlet apertures 172 across the runner portion 134 have an inlet end 174 and an outlet end, and that the inlet end 174 of the outlet apertures 172 is radially spaced-apart from the axially-extending internal surface 133 of the runner portion 134 which extends along the outer contact surface 132 of the runner portion 134 which contacts the ring segments 122 and which receives heat from the rubbing engagement therewith during use of the gas turbine engine. This radial spacing 176, also referred to herein as the 'given spacing distance 176', between the inlet end 174 of the outlet 170 and the radially-inner (cooling) surface 133 of the runner portion 134, forms an annular pocket 178 which has the given radial thickness 176 and in which an annular pool of cooling fluid having a corresponding radial depth can be received and be maintained during use, which can assist in optimizing the cooling action. Accordingly, during use, an annular pool of cooling fluid of a depth associated to the given radial thickness 176 is maintained in the annular pocket as 'new', or 'cold' cooling fluid enters the annular pool from the radial segment 148 at the distal end 129 and 'used' or 'hot' cooling fluid exits the annular pool from the outlet 170 at the proximal end 127.

More specifically, in this embodiment, the runner portion 134 has a radially-inward extending portion 180 adjacent to the radially-inner cooling surface 133, and the outlet 170 is provided in the form of at least one aperture 172 provided across the radially-inward extending portion 180.

Moreover, in this embodiment, the sleeve portion 136 of the runner assembly 130 is formed with an annular recessed portion 182 on the radially-inner, cooling-fluid-guiding surface thereof, which is positioned near the distal end of the sleeve portion 136, and in which cooling fluid can accumulate and even out (uniformize) in a manner to then be distributed into the radially-outward segment 148 in a more circumferentially uniform film or flow than if the cooling fluid was not allowed to even out in the recessed portion 182. Accordingly, in this specific embodiment, the function of the recessed portion 182 in the sleeve portion, which can alternately be referred to herein as a 'gutter' for ease of reference, is to allow evening out of the flow of cooling fluid in the circumferential orientation by contrast with the function of the radial spacing 176 between the inlet end 174 of the outlet 170 and the radially-inner surface 133 of the runner portion 134 which is to form the annular pool of cooling fluid having a given thickness immediately against the portion of the runner assembly which is likely to be most exposed to heat during use.

It will be understood that in the embodiment shown in FIG. 2, the bearing and seal assembly shown is a bearing and seal assembly of a low pressure fan/boost stage, but it will be understood that the internally-cooled runner assembly described herein can alternately be applied to a turbine stage, or to a high-pressure compressor stage, for instance. In alternate embodiments, the seal can be forward of the bearing or rearward of the bearing.

For instance, an embodiment such as shown in FIG. 2 can have incorporated therein either one of the feature of the pool of cooling liquid having a given thickness on the radially-inner surface of the runner portion and the feature of the gutter on the radially-inner surface of the sleeve portion to uniformize the flow of cooling liquid across the radial segment of the cooling fluid passage.

When used in a gas turbine engine 10 such as that depicted in FIG. 1, the present seal and bearing assembly may be used about any rotating shaft or other element thereof, such as for example about at least one of the main engine shafts 11 and 13. Alternately, the seal and bearing assembly may be employed to seal another rotating shaft in the gas turbine engine 10 or in another turbomachine, pump, compressor, turbocharger or the like. The runner assembly 30 may be mounted to the shaft using any suitable means, such as by using a threaded stack nut 29 which fastens the runner assembly in place about the shaft 13, as shown in FIG. 2. Regardless, the runner assembly 30 is rotationally fixed in place to the shaft 13, such that it rotates within the ring segments 22 and remains in contact therewith when the shaft 13 rotates. Thus, the contact seal provides a fluid seal about the rotating shaft. Moreover, it will be understood that the seal and bearing assembly can be suitable for use in other gas turbine engines than turbofan engines, such as turboprop or turboshaft engines to name other examples.

The above description is meant to be exemplary only, and one skilled in the art will recognize that changes may be made to the embodiments described without departing from the scope of the invention disclosed. For example, the sleeve can be made shorter than the runner and the oil can be distributed by an axial gap between the distal end of the sleeve and the runner instead of through holes in the sleeve portion in alternate embodiments. Moreover, in alternate embodiments, the cooling fluid passage can be in the form of a continuous annular passage around the rotation axis of the shaft, or provided in the form of a plurality of arcuate passage portions interspaced circumferentially from one another around the shaft. Still other modifications which fall within the scope of the present invention will be apparent to those skilled in the art, in light of a review of this disclosure, and such modifications are intended to fall within the appended claims.

The invention claimed is:

1. A seal and bearing assembly for a gas turbine engine, the seal and bearing assembly comprising:
   a rotary assembly having a bearing inner ring and a runner assembly both mounted to a rotary shaft of the gas turbine engine, the runner assembly having a runner portion rotating with the rotary shaft, a sleeve portion being concentric and radially internal to the runner portion, the sleeve portion rotating with the rotary shaft, the runner portion and the sleeve portion forming a cooling fluid passage having an inlet, an outgoing segment, a radial segment and a returning segment, the inlet communicating with a radially-inner surface of the sleeve portion at a proximal end of the runner assembly, the outgoing segment extending from the inlet and axially along the radially-inner surface of the sleeve portion, away from the bearing inner ring, to a distal end of the runner assembly, the radial segment fluidly linking the outgoing segment with the returning segment via a passageway formed at the distal end of the runner assembly, across a radial thickness of the internal sleeve, and the returning segment extending from the radial segment and axially along a radially-inner surface of the runner portion, toward the bearing inner ring, the returning segment being between the radially-inner surface of the runner portion and a radially-outer surface of the sleeve portion; and a case assembly rotatably receiving the rotary assembly, the case assembly having a bearing outer ring complementary to the bearing inner ring in receiving roller elements therebetween, ring segments positioned in abutment with a radially-outer surface of the runner portion and axially spaced apart from each other, the radially-outer surface of the runner portion extending axially, a bearing cavity extending from the ring segments to the bearing outer rings, and at least one cooling fluid nozzle positioned in the bearing cavity between the bearing outer rings and the ring segments, the at least one cooling fluid nozzle being directed radially inward and operable to feed cooling fluid to the inlet of the cooling fluid passage of the runner assembly during use.

2. The seal and bearing assembly of claim 1 wherein the outgoing segment of the cooling fluid passage terminates at a gap between a distal end of the runner portion and the radially-outer surface of the sleeve portion.

3. The seal and bearing assembly of claim 1 wherein the passageway is one of a gap and a plurality of holes.

4. The seal and bearing assembly of claim 1 wherein the rotary assembly further comprises a concentric annular scoop member having a radially-outer facing channel positioned radially inwardly from the at least one cooling fluid nozzle to receive cooling fluid therefrom during use, a radially-inner facing channel leading axially toward the inlet of the cooling fluid passage, and at least one scoop aperture extending across a thickness of the annular scoop member, from the radially-outer facing channel to the radially-inner facing channel.

5. The seal and bearing assembly of claim 4 wherein the annular scoop member further comprises a second radially-inner facing channel adjacent the first radially-inner facing channel in the axial orientation and directing received cooling fluid toward the bearing inner ring, and a set of second scoop apertures extending across the thickness of the annular scoop member, from the radially-outer facing channel to the second radially-inner facing channel.

6. The seal and bearing assembly of claim 4 wherein the annular scoop member is made integral to the sleeve portion.

7. The seal and bearing assembly of claim 6 wherein the runner assembly further has an enclosing portion being concentric and extending radially inwardly of both the runner portion and the sleeve portion and having a radially-outer surface cooperating with the radially-inner surface of the sleeve portion in enclosing the outgoing segment of the cooling fluid passage between the inlet and the radial segment, wherein a distal end of the enclosing portion is made integral to the distal end of the runner portion and forms an impervious seal at the distal end of the cooling fluid passage, wherein a distal end of the sleeve portion is abuttingly received against and the integral enclosing portion and runner portion.

8. The seal and bearing assembly of claim 7 wherein the integral enclosing portion and runner portion are not welded to the integral annular scoop member and sleeve portion and are axially separable therefrom during engine maintenance.

9. The seal and bearing assembly of claim 1 wherein the runner assembly further has an enclosing portion being concentric and extending radially inwardly of both the runner portion and the sleeve portion and having a radially-outer surface cooperating with the radially-inner surface of the sleeve portion in enclosing the outgoing segment of the cooling fluid passage between the inlet and the radial segment.

10. The seal and bearing assembly of claim 9 wherein the distal end of the enclosing portion is welded to the distal end of the runner portion.

11. The seal and bearing assembly as defined in claim 9, wherein the inlet is provided in the form of a plurality of circumferentially interspaced entry holes defined in the enclosing portion.

12. The seal and bearing assembly of claim 1 wherein the rotary shaft is a high-pressure shaft of the turbine and the bearing cavity is in a turbine section of the gas turbine engine.

13. The seal and bearing assembly of claim 1 wherein the outgoing segment and the returning segment are both oriented parallel to and concentric with the axis of rotation of the rotary shaft and the outgoing segment is radially inward of the returning segment.

14. The seal and bearing assembly of claim 1 wherein the proximal end of the runner portion has a cooling fluid outlet, the outlet having an inlet end receiving the cooling fluid from the cooling fluid passage during use, the inlet end being radially spaced apart from the axially-extending radially-inner surface of the runner assembly by a given spacing distance in a manner to form a pool of cooling fluid having a depth corresponding to the given spacing distance against the radially-inner surface of the runner assembly during use.

15. The runner assembly of claim 1 wherein the sleeve portion has an annular recess formed in a radially-inner surface thereof, adjacent the distal end, for allowing circumferential uniformization of the cooling fluid flow led into the radial segment during use.

16. A method of assembling a seal and bearing assembly of a gas turbine engine having an engine case and a rotary shaft for rotation in the engine case around a main axis, the seal and bearing assembly including:

a bearing inner ring and a runner assembly both mounted to a rotary shaft, the runner assembly having a runner portion, a sleeve portion being concentric and radially internal to the runner portion, and a cooling fluid passage having an outgoing segment extending along a radially-inner surface of the sleeve portion, a returning segment extending along the radially-inner surface of the runner portion, and a radial segment bridging the outgoing segment and the returning segment at a distal end of the runner assembly, and a bearing outer ring, ring segments and at least one cooling fluid nozzle, all being mounted to the engine case, with the at least one cooling fluid nozzle being located between the axial locations of the bearing outer ring and the ring segments and being directed radially inwardly, the method of assembly comprising:

positioning the engine case and rotary shaft in axial alignment, and axially moving the engine case relative to the rotary shaft including moving the bearing outer ring across the axial location of the runner portion and into an assembled condition in which roller bearings are operably received between the bearing outer ring and the bearing inner ring.

17. A gas turbine engine comprising one or more compressors, a combustor and one or more turbines, at least one of said compressors and at least one of said turbines being interconnected by an engine shaft rotating about a longitudinal axis thereof, the gas turbine engine comprising:

a rotary assembly having a bearing inner ring and a runner assembly both mounted to a rotary shaft of the gas turbine engine, the runner assembly having a runner portion rotating with the rotary shaft, a sleeve portion being concentric and radially internal to the runner portion, the sleeve portion rotating with the rotary shaft, the runner portion and the sleeve portion forming a cooling fluid passage having an inlet, an outgoing segment, a radial segment and a returning segment, the inlet communicating with a radially-inner surface of the sleeve portion at a proximal end of the runner assembly, the outgoing segment extending from the inlet and axially along the radially-inner surface of the sleeve portion, away from the bearing inner ring, to a distal end of the runner assembly, the radial segment fluidly linking the outgoing segment with the returning segment via a passageway formed at the distal end of the runner assembly, across a radial thickness of the internal sleeve, and the returning segment extending from the radial segment and axially along a radially-inner surface of the runner portion, toward the bearing inner ring, the returning segment being between the radially-inner surface of the runner portion and a radially-outer surface of the sleeve portion; and a case assembly rotatably receiving the rotary assembly, the case assembly having a bearing outer ring complementary to the bearing inner ring in receiving roller elements therebetween, ring segments positioned in abutment with a radially-outer surface of the runner portion and axially spaced apart from each other, the radially-outer surface of the runner portion extending axially, a bearing cavity extending from the ring segments to the bearing outer rings, and at least one cooling fluid nozzle positioned in the bearing cavity between the bearing outer rings and the ring segments, the at least one cooling fluid nozzle being directed radially inward and operable to feed cooling fluid to the inlet of the cooling fluid passage of the runner assembly during use.

18. The gas turbine engine of claim 17 wherein the outgoing segment of the cooling fluid passage terminates at a gap between a distal end of the runner portion and the radially-outer surface of the sleeve portion.

19. The gas turbine engine of claim 17 wherein the rotary assembly further comprises a concentric annular scoop member having a radially-outer facing channel positioned radially inwardly from the at least one cooling fluid nozzle to receive cooling fluid therefrom during use, a radially-inner facing channel leading axially toward the inlet of the cooling fluid passage, and at least one scoop aperture extending across a thickness of the annular scoop member, from the radially-outer facing channel to the radially-inner facing channel.

20. The gas turbine engine of claim 17 wherein the runner assembly further has an enclosing portion being concentric and extending radially inwardly of both the runner portion and the sleeve portion and having a radially-outer surface cooperating with the radially-inner surface of the sleeve portion in enclosing the outgoing segment of the cooling fluid passage between the inlet and the radial segment.

* * * * *